June 2, 1959  F. S. FLICK  2,888,951
ACTUATOR VALVE
Filed March 21, 1956  2 Sheets-Sheet 1
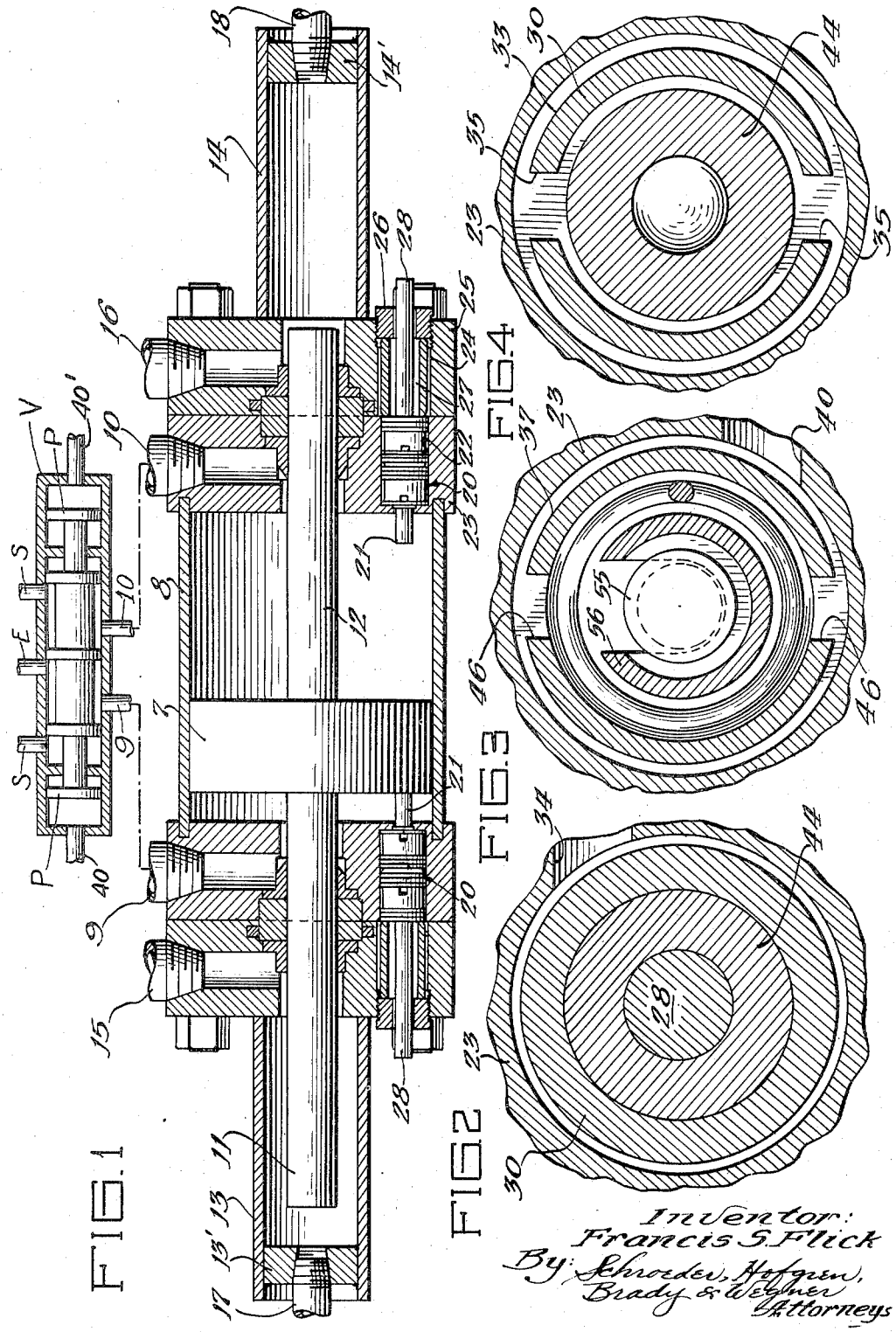
Inventor:
Francis S. Flick
By Schroeder, Hofgren,
Brady & Wegner
Attorneys

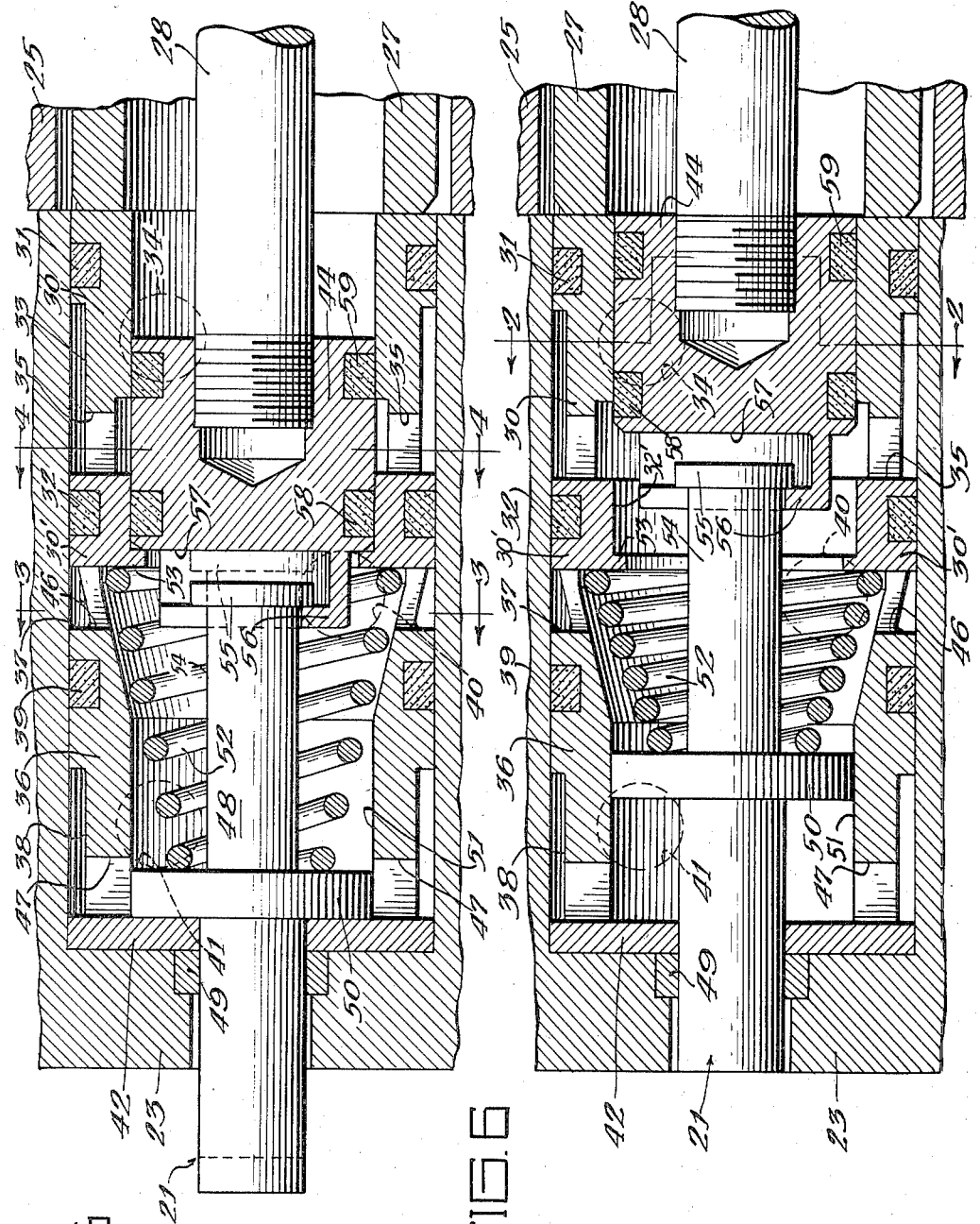

United States Patent Office 2,888,951
Patented June 2, 1959

2,888,951

ACTUATOR VALVE

Francis S. Flick, Oak Park, Ill., assignor to Flick Reedy Corporation, a corporation of Illinois Application March 21, 1956, Serial No. 572,952

10 Claims. (Cl. 137—622)

This invention relates to an actuator valve for a fluid control used in reciprocating or sequence operations of fluid operated devices.

The actuator valve of this invention is of the type used in control circuits operated by a fluid for governing the operation of fluid operated apparatus with which it may be associated. The actuator valve may be placed so that it may be physically contacted and parts of it moved to change connection between fluid lines leading into the valve. An important feature of the present actuator is that it operates with a snap action to make the change in the connection. Some difficulty in this type of valve has been encountered in the past when the valve was moved sufficiently to make a partial connection between the lines permitting pressures within the control circuit which tended to render the circuit inoperative.

One of the uses of the present valve is in connection with piston and cylinder devices wherein the valve is a part of a fluid operated control circuit controlling the flow of motive fluid to the piston and cylinder device. The valve may be so placed as to be contacted by a reciprocating piston at, or near, the end of its stroke. The actuator valve when contacted by the piston may in turn control a four-way valve effecting the flow of motive fluid to the piston and cylinder device. It is important that this control function properly even though the piston may be moving quite slowly as it contacts the actuator valve. It is in this latter field that difficulty has been encountered in the past. The present actuator valve structure operates equally well whether the piston contacting it be moving rapidly or quite slowly.

For example, the actuator may control a cylinder operated four-way valve in turn controlling flow of air to the piston and cylinder device striking the actuator. When air is fed gradually to the cylinder operated valve through the actuator, the valve may shift partway to exhaust air from the piston and cylinder device but may fail to exhaust completely and to supply full and continuous pressure to the other side of the piston. When this occurs, the piston and cylinder device stalls. The present invention overcomes this difficulty.

The principal object of this invention is to provide a new and improved actuator valve for use in fluid control circuits.

A further object is to provide an actuator valve of the character described having structure providing a snap action in changing the connection between its fluid ports.

Another object is to provide a new and improved actuator valve which does not have a position in which a gradual small flow may occur through the valve.

Another object is to provide an actuator valve of the character described having structure for maintaining a communication between exhaust and supply fluid ports preventing buildup of partial pressure in the control outlet line until the supply port is fully open.

A still further object is to provide a new and improved actuator valve having a pair of valve members with a lost motion connection permitting one of the members to quickly open the fluid supply port into the valve even through the valve members are moved quite slowly.

Other objects, features and advantages of the present invention will be apparent from the following description of a preferred embodiment illustrated in the accompanying drawings in which:

Figure 1 is a vertical sectional view through a double acting booster and its control valve, the former having actuator valves of the present invention mounted therein.

Figure 2 is a sectional view through the valve taken substantially along line 2—2 in Figure 6.

Figure 3 is a sectional view through the valve taken substantially along line 3—3 in Figure 5.

Figure 4 is a sectional view through the valve taken substantially along line 4—4 in Figure 5.

Figure 5 is a fragmentary sectional view through the valve taken longitudinally through the valve structure illustrated in Figure 1 showing the valve parts in position connecting the exhaust and control fluid ports; and Figure 6 is a view similar to Figure 5 showing the position of the valve parts in connecting the supply and control fluid ports.

An appreciation of the problem involved in providing a fluid operated control circuit in reciprocal or sequence operations may be obtained from an allustrative example of one application of the present actuator valve. In Figure 1, there is illustrated an air operated booster mechanism for supplying hydraulic fluid at high pressures. The hydraulic fluid may be used to operate cylinders in turn driving a machine of one kind or another. The booster may be used to supply fluid at the high pressure needed and to make up for leakage of the fluid which invariably occurs in a hydraulic system. In instances requiring the holding of a high pressure, as for example in a plastic molding press, the booster may be required to move quite slowly. During this slow movement period, the booster piston may also be required to change its direction of movement. The actuator valves in the control circuit for the booster are used to effect the change of a four-way valve V in order to direct the motive fluid to the booster on the opposite side of the piston. The main difficulty in fluid operated actuator valves has been in instances where the cycling or sequence of operations must be effected with very slow moving machine parts.

In Figure 1, an air operated booster piston 7 mounted within a cylinder 8 is caused to reciprocate by air pressure admitted from supply lines S through one or the other of connecting air lines 9 or 10 in order to drive plungers 11 and 12 into the respective hydraulic cylinders 13 and 14. Hydraulic fluid is admitted into the cylinders through check valves (not shown) and connecting fluid pressure lines 15 and 16 respectively with the high pressure fluid flowing out through outlet connections 17 and 18 in the cylinder heads 13' and 14'. The structure of the booster includes appropriate heads and tie rods as well as bushings and seals for the plungers. None of this structure is particularly pertinent to the present invention and is illustrated only for the purpose of further defining the structure of the actuating valve and explaining its operation.

A pair of actuator valves generally indicated 20 are shown as mounted one in each head of the booster so as to be contacted by the booster piston cylinder. The valves 20 are identical in structure and each has a contact rod 21 extending within the cylinder 8 of the booster. The valve at the left hand end of Figure 1 is shown as in contact with the piston 7 so that it would be moved as the piston travels to the end of its stroke toward the left in the figure.

The actuator valves in the present illustration are used to change the flow of compressed air through the connections 9 and 10 into the booster cylinder 8 in the usual manner. A four-way valve V may be used to control the supply S or exhaust E of compressed air to, and from, the booster. This valve in turn may have small piston pilots P which throw the four-way valve from one side to the other to effect the change required. Compressed air in the control circuit is led through actuator valves 20 and then to the pilots so that the flow to one side or the other of the piston 7 is changed only when the booster piston has reached the end of its stroke.

As mentioned in the example above, the booster piston may be moved quite slowly in a situation where only the leakage of very high pressure fluid is being made up by the movement of one of the plungers into its cylinder. The leakage may be very small in amount so that it is immediately evident that the movement of the booster piston would be quite gradual. It is desirable in these instances to effect the change in flow of air in the connections 9 and 10 very quickly so that the pressure on the hydraulic fluid is not allowed to diminish. Additionally, it is important that the booster not be permitted to stop or stall by having the actuator valve shift the pilot piston in the four-way valve to an intermediate position which would allow partial exhaust and/or partial pressure to the opposite side of piston only momentarily, allowing the piston to back off from the actuator so that the leakage could eventually reduce the holding pressure. The actuator valves of the present invention have a snap action which immediately effects the change in the control circuit and thus in the flow of motive fluid to the piston of the booster. This action occurring quite rapidly does not depend on the speed of movement of the machine part, or as in this instance, the booster piston. Thus it is quite possible to have a pneumatic control circuit which operates as effectively as an electrical snap switch.

The actuator valve shown herein may be used in any fluid operated control circuit wherein sequencing is desired. The installation of the valve may vary as requirements dictate. Thus, this actuator might be operated by cams or dogs attached to a reciprocating part of the machinery rather than in a piston and cylinder device such as the booster illustrated. The structure of this valve in any of these instances need be modified only slightly to accommodate it to various control circuit situations.

In the present instance, the valve is mounted within a bore 22 formed in the head 23 on the booster cylinder and is accessible through an aligned bore 24 formed in the head 25 of the hydraulic cylinder 14. A threaded nut 26 may be utilized to hold the valve in place through pressing upon a sleeve 27 abutting the rearward part of the actuator valve. The sleeve and nut also provide a means for mounting a sight rod 28 which can be used in emerergency to operate the actuator valve by hand. The present safety regulations often require the installation of such rods 28, however, they are not needed with the present valve structure since there is in effect no null position of the valve.

The present valve structure has one cylindrical housing part with portions 30 and 30' carrying a pair of O-rings 31 and 32 between which there is a groove 33 in communication with a fluid supply line 34 which may be tapped into the head 23 of the booster so as to communicate with the groove 33. Supply fluid may be admitted to the interior of the valve structure through a pair of diametrically opposite supply ports 35.

An adjacent part 36 of the housing has a pair of grooves 37 and 38 about its periphery separated by an O-ring 39. The groove 37 is in communication with a fluid control line 40 (see also Fig. 1) also tapped into the head of the booster so as to align with the groove. The groove 38 is similarly in communication with an exhaust line 41 also tapped in the head of the booster. The remaining part of the housing comprises a cover 42 closing the forward end of the valve housing part 36. It is a matter of convenience that the housing is formed in parts as described above particularly since the valve is to be installed in a bore formed in the head of a piston and cylinder device. In other instances, the valve may be housed separate and apart from the machine with which it is to be used. In such cases, the grooves about the exterior of the valve housing parts may be omitted and the fluid lines for moving the four-way valve connected directly with ports formed in the housing. The right hand actuator would have a control line 40' similarly arranged to the control line 40 for the left hand actuator (Fig. 1).

The present actuator valve is of the spool type in that the valve member within the housing operates to connect or block the passage between the ports. Thus, fluid supplied through the ports 35 may be blocked from entering into the housing by one valve member 44 as shown in Figure 5. Communication is provided between the ports 46 leading to the control line 40 and the ports 47 leading to the exhaust line 41 by the position of the second valve member 48, also shown in Figure 5. The valve part 48 includes the contact stem 21 previously referred to. The stem extends outwardly through the head of the booster and is sealed against fluid leakage around it by an O-ring 49 mounted against the cover 42.

The two valve parts 44 and 48 act in conjunction. The valve part 48 has an enlargement or land 50 slidable within the cylindrical portion 51 of the housing part 36. The seat between the land and cylindrical surface is not exact so that some leakage may always occur around its periphery to the exhaust ports 47. A spiral compression spring 52 yieldingly urges the valve part 48 to the left in Figure 5 by bearing against the enlargement 50 and a ledge 53 on the housing part 30'.

In order to provide a snap action in the opening of the actuator valve, there is a lost motion connection between the valve parts. In this instance, the stem portion 54 of valve part 48 has an enlargement 55 on its inner end mounted within a retainer 56 attached to the valve part 44. A lost motion to the extent indicated between full and dotted line positions in Figure 5 is thus permitted between the valve parts. As the actuator contact stem 21 is moved to the right in Figure 5, valve part 48 will move to the right until the enlargement 55 strikes the face 57 of the valve part 44. Further movement in the same direction will cause both valve parts to move in unison. Also, as the actuator stem is moved to the right, the land 50 will move past the port 47 into position opposite the internal surface 51 on the valve part 36. Some leakage from the supply port 35 may find its way past the O-ring 58 because of dirt or scratches on the O-ring or on the surface 32' on which the O-ring seats. Any such leakage should not be allowed to enter the control port 37 and partially shift the four-way control valve. To prevent such action, the outer diameter of the land 50 is made slightly smaller than the internal diameter of the surface 51 so that any leakage past the O-ring 58 may find its way to the exhaust port 47.

The portion of the valve member used to open and close the supply port is a spool having O-rings 58 and 59 about its periphery so spaced that they provide a positive sealing of the supply ports when in closed position. As the spool is moved toward the right, the exhaust port is further closed except for desired leakage and then the ports 35 will be gradually opened. As soon as any volume of air beyond leakage through to the exhaust port is admitted into the housing through a partially open port, a force is exerted upon the valve part 44 causing it to move rapidly to the right at least to the extent of the lost motion connection provided. There is no resistance other than friction to this movement since there is only atmospheric pressure on the right hand side of the valve spool 44. After the lost motion connection is taken up, the resistance of the spring 52 may stop the motion; however, the spool 44 may move sufficiently far to fully open the ports 35 and thus admit full supply pressure to the interior of the housing and to the control line.

The condition of the valve parts when the supply is connected to the control is illustrated in Figure 6. The pressure within the housing maintains the spool 44 in its right hand position as illustrated. Some leakage will occur past the land 50 to the exhaust port but this does not affect the operation of the valve since full supply pressure will be present in the control line. Upon release of the motive force on the contact stem 21, the spring 52 operates to return the valve parts to the position illustrated in Figure 5. As soon as this occurs, the pressure of air in the control line may pass through the valve to the exhaust line 41. A very important feature of the present valve is that normal leakage past the O-ring seals does not affect its operation. In the past, there has been possible the buildup of a slight or partial pressure in the control line as the valve is moved from one position to the other. In the present instance, the leakage permitted around the land 50 is sufficient to exhaust all pressure passing the seals. Thus, normal seal leakage due to imperfections, wear, dirt or scratches does not affect the control of the device in circuit with the actuator valve.

The step-by-step operation would be as follows assuming these conditions: Fig. 5 to show the left-hand actuator (turned around in the view) about to be contacted and moved by the booster piston; air through the four-way valve driving the booster piston toward the left quite slowly as shown in Fig. 1; the left hand side of booster piston connected to exhaust through the four-way valve as shown in Fig. 1; the four-way valve spool being at rest since no upsetting force is working on its piston operators P; and the desired operation being to reverse the connections of air to the booster piston instantaneously without any possibility of a stall.

First, the booster piston 7 engages stem 21 of the actuator valve and starts to move it slowly into its housing. This movement starts to take up the lost motion and also moves enlargement 50 past the edge of annular passage 47 to substantially close exhaust line 41 from the actuator. There is now a generally closed chamber within the actuator between the sealing ring 58 and the enlargement 50 which is in communication with the control line 40.

Next, the lost motion taken up, valve spool 44 is pushed by the slowly advancing booster piston. O-ring 58 on the spool 44 eventually will uncover a little bit of passage 35 connected with air supply line 34 to the actuator valve. Air rushes into the chamber previously described and builds up pressure therein since it cannot go out the exhaust—enlargement 50 blocking the way. This pressure snaps open the valve spool 44 letting in full air supply line pressure which also goes through control line 40 at full line pressure and positively moves the four-way valve. Leakage around enlargement 50 is enough to prevent premature build up of pressure in the described chamber but not enough to pass the full line air flow once the valve 44 is snapped open. Thus, insured, is the switching of the air to the booster piston without possibility of stall.

The snap action of the present actuator valve insures that the full control air pressure will be almost instantaneously conducted to any apparatus in the circuit with the actuator. There can be no gradual buildup of pressure in the control circuit and thus no stalling or delayed action of the apparatus so controlled. It is believed obvious that the present actuator may be used in any fluid control sequencing operation and that slight modifications may be made in the structure while retaining the principles of operation in the actuator itself.

The foregoing detailed description has been given for clearness of understanding only, and no unnecessary limitations should be understood therefrom, for some modifications will be obvious to those skilled in the art.

I claim:

1. An actuator valve for use in sequence control of fluid apparatus, comprising: a housing having a control port and spaced fluid supply and exhaust ports for alternate connection with a fluid control line to said control port, said housing having internal flow passages for connecting said ports; a pair of relatively movable valve spools slidable within the housing for affecting said alternate connections, means providing contact between said spools, one spool being freely movable by fluid pressure in the housing first admitted through the supply port when partially open so as to open the port with a snap action preventing delay in conducting fluid from the supply to the control line; and a contact member secured to the other spool and extending out of the housing for receiving a force providing initial movement of both spools within the housing.

2. An actuator valve as specified in claim 1 wherein the valve spools are provided with a lost motion connection permitting the movement of said one spool under influence of fluid pressure in the housing to open position and return of said one spool to closed position upon movement of the other spool.

3. An actuator valve as specified in claim 1 wherein said other spool is provided with means substantially blocking fluid flow from the control line to the exhaust port prior to moving engagement with said one spool valving the supply port.

4. An actuator valve for use in sequence control of fluid apparatus, comprising: a housing having a control port and spaced fluid supply and exhaust ports for alternate connection with a control fluid line to said control port, said housing having internal flow passages for connecting said ports; a pair of relatively movable valve spools slidable within the housing by an external force for effecting said alternate connections, one of the spools permitting leakage between the control line and exhaust port and the other spool being freely movable under pressure of supply fluid entering the housing through the supply port when partially open and in quantity greater than said leakage to snap to spool to a position fully opening the supply port.

5. An actuator valve having a housing with spaced supply, and exhaust fluid ports and an intermediate fluid port adapted for connection with a unit to be controlled; a two part valve member slidable within the housing, one part valving the supply port and the other part having means for blocking flow from the intermediate port to the exhaust port when moved from a rest position; an external rod member secured to said other part for receiving a motive force, and said valve member parts having a lost motion connection permitting said one part to be moved with a snap action to full open position by pressure admitted to the housing through the supply port when partially open.

6. An actuator valve as specified in claim 5 wherein the housing is provided with external annular recesses communicating with said ports permitting said housing to be mounted within a bore having fluid lines leading into the bore.

7. An actuator valve, comprising: a hollow housing having at least three ports spaced longitudinally apart; a valve member slidable longitudinally within the housing for connecting only two of the ports at a time, said valve member having two parts connected together with a lost motion connection with one of the parts having a rod portion extending out of the housing to be contacted by a motive force, means yieldingly urging the valve member to a position closing the supply port and said rod member out of the housing, said lost motion connection permitting fluid under pressure admitted to the housing through a partially open port to snap the valve member past the port to the extent of said lost motion connection admitting full supply fluid pressure into the housing when the valve member has been moved to an extent partially opening the supply port.

8. An actuator valve for use in sequence control of fluid apparatus, comprising: a hollow elongated housing having spaced fluid supply and exhaust ports and an intermediate control fluid port communicating with the interior of the housing; a first valve spool having a rod member extending out of the housing and a land slidable within the housing to open and close communication between the control port and exhaust port; a second valve spool slidable within the housing to open and close the fluid supply port, said second spool having peripheral sealing means preventing fluid to pass the spool and escape from the housing; means providing a lost motion connection between the valve spools; and means yieldingly urging the first valve spool toward one end of the housing and said rod member out of the housing, said lost motion connection permitting blocking of the passage between the control port and exhaust port upon first movement of the rod member into the housing and then movement of the second spool for opening the supply port, said second spool being movable by the first fluid pressure admitted through the supply port when partially open to snap the spool toward supply port open position preventing delay in opening the supply port.

9. An actuator valve as specified in claim 8 in which the housing is formed in sections assembled end to end with external seals dividing spaces about the housing so that the valve may be placed in a bore having fluid line connections for communication with said ports.

10. An actuator valve as specified in claim 8 in which the first valve spool has a sliding fit within the housing permitting some leakage of fluid past the spool to the exhaust port so that normal leakage in the valve is ineffective in the control fluid port.

References Cited in the file of this patent

UNITED STATES PATENTS

| | | |
|---|---|---|
| 2,385,733 | Schroer | Sept. 25, 1945 |
| 2,424,331 | Rose | July 22, 1947 |
| 2,453,812 | Phelan | Nov. 16, 1948 |
| 2,716,425 | Yarber | Aug. 30, 1955 |

FOREIGN PATENTS

| | | |
|---|---|---|
| 5,594 | Great Britain | Mar. 6, 1912 |